United States Patent [19]
Ozaki

[11] Patent Number: 5,957,998
[45] Date of Patent: Sep. 28, 1999

[54] DISCRETE COSINE TRANSFORM METHOD

[75] Inventor: Nozomu Ozaki, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/812,761

[22] Filed: Mar. 6, 1997

Related U.S. Application Data

[63] Continuation of application No. 08/243,837, May 17, 1994, abandoned.

[30] Foreign Application Priority Data

May 19, 1993 [JP] Japan ..................................... 5-117317

[51] Int. Cl.$^6$ ..................................................... G06F 17/14

[52] U.S. Cl. ......................... 708/402; 708/203; 345/154; 382/250

[58] Field of Search ......................... 364/725.01–727.01, 364/715.02; 382/250; 345/154

[56] References Cited

U.S. PATENT DOCUMENTS

| | | | |
|---|---|---|---|
| 4,293,920 | 10/1981 | Merola ..................................... | 364/725 |
| 4,841,464 | 6/1989 | Guichard et al. ....................... | 364/725 |
| 5,128,757 | 7/1992 | Citta et al. .............................. | 358/133 |
| 5,164,980 | 11/1992 | Bush et al. .............................. | 379/53 |
| 5,347,305 | 9/1994 | Bush et al. .............................. | 348/14 |
| 5,565,921 | 10/1996 | Sasaki et al. ........................... | 348/409 |
| 5,572,236 | 11/1996 | Feig et al. ............................... | 345/154 |

*Primary Examiner*—Emmanuel L. Moise
*Attorney, Agent, or Firm*—Frommer Lawrence & Haug, LLP.; William S. Frommer

[57] ABSTRACT

When a weighted calculation in which a cosine-transformed coefficient is multiplied with diagonal matrixes from the right and left direction is carried out, a new transform matrix is obtained by previously multiplying a weighting diagonal matrix and the cosine transform matrix and input data is transformed by using the new transform matrix. Thus, a circuit scale can be reduced, the processing steps can be simplified, and the cost can be reduced. When a weighted calculation in which a cosine transformed coefficient C is multiplied with a diagonal matrix W from the right and left directions is carried out, the weighted cosine transform is carried out by using a new transform matrix Fw which results from previously multiplying the weighting diagonal matrix W and the cosine transform matrix F.

5 Claims, 2 Drawing Sheets

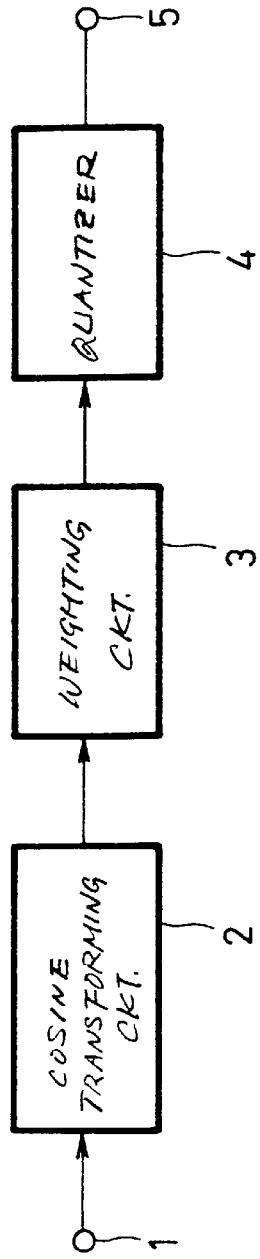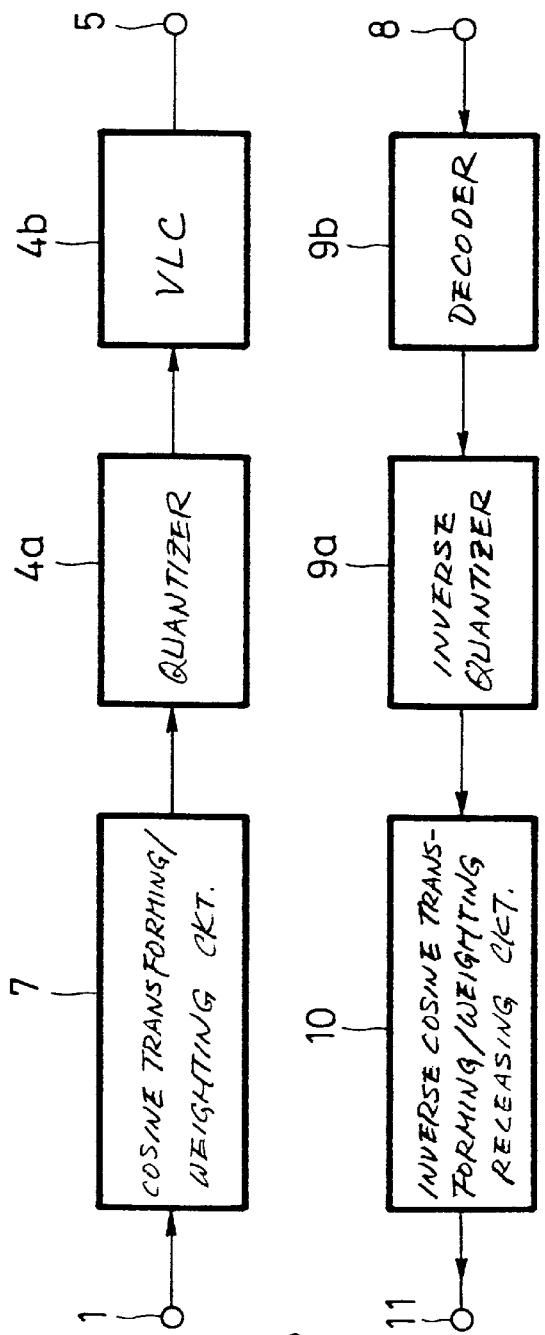
FIG. 1 (RELATED ART)
FIG. 2
FIG. 3

DISCRETE COSINE TRANSFORM METHOD

This application is a continuation of application Ser. No. 08/243,837, filed May 17, 1994 now abandoned.

BACKGROUND OF THE INVENTION

1. Field of the Invention

The present invention relates to a discrete cosine transform (DCT) method, and more particularly to a weighted discrete cosine transform method for use with an apparatus which transform-codes input data, e.g., electronic equipments, such as a digital VTR (video tape recorder) and a variety of data transmission apparatus, for example.

2. Description of the Related Art

Recently, a digital VTR and a transmission apparatus, such as a teleconference system, use a technology for transform-coding image data. One of the most popular transform-coding methods is a discrete cosine transform (DCT) method, for example. As is well known, according to the discrete cosine transform method, input data is transformed into coefficient data ranging from a DC component to a high-order AC component. It is customary that coefficient data thus transformed by the discrete cosine transform method is processed later by some suitable data processing methods, such a weighting and a quantization. The quantization obtains quantized coefficient data by quantizing at a predetermined quantization level the coefficient data obtained when input image data is transform-coded by a transform-coding method, such as the discrete cosine transform or the like.

Coefficient data thus transform-coded and quantized is compressed by a variable length coding using a variable length code, such as a run length code and a Huffman coding. Then, the compressed data is recorded on a recording medium or transmitted to a transmission apparatus.

Upon playback or after the transmission, original image data is obtained by the reverse procedure. Specifically, after the transform-coded data was decoded, the coefficient data obtained in the discrete cosine transform is obtained by inverse-quantizing the decoded data. Then, the original image data is obtained by processing the coefficient data in an inverse discrete cosine transform (IDCT) fashion. That is, a series of the above-mentioned processing is executed in order to reduce an information amount of recorded or transmitted data.

FIG. 1 of the accompanying drawings shows an example of a cosine transform apparatus according to the related art. The cosine transform apparatus will be described below with reference to FIG. 1.

As shown in FIG. 1, data, such as image data to be recorded or transmitted is supplied to an input terminal 1 from a digital VTR or a transmission apparatus body circuit (not shown). The image data supplied to the input terminal 1 is supplied to a cosine transforming circuit 2.

The image data supplied to the cosine transforming circuit 2 through the input terminal 1 is transformed into coefficient data ranging from a DC component to a high-order AC component. Coefficient data thus transformed by the cosine transforming circuit 2 is supplied to a weighting circuit 3. The coefficient data supplied to the weighting circuit 3 from the cosine transforming circuit 2 is multiplied with a predetermined multiplier by the weighting circuit 3 and is thereby weighted. Data weighted by the weighting circuit 3 is supplied to a quantizer 4, in which it is quantized at a predetermined quantization level. Then, quantized data from the quantizer 4 is supplied through an output terminal 5 to the digital VTR or other circuit of the transmission apparatus, e.g. a variable length coder (VLC) using a variable length code, such as a run length code and a Huffman code, though not shown.

The cosine transforming circuit 2 cosine-transforms the input data by the calculation shown by the following equation (1):

$$C = F \cdot D \cdot F^T \tag{1}$$

where D is the two-dimensional input data, C is the two-dimensional cosine coefficient and F is the one-dimensional forward cosine transform matrix.

The parameters D, C and F shown in the equation (1) can be expressed by the following equations (2), (3) and (4):

$$D = \begin{bmatrix} D00 & D01 & D02 & D03 & D04 & D05 & D06 & D07 \\ D10 & D11 & D12 & D13 & D14 & D15 & D16 & D17 \\ D20 & D21 & D22 & D23 & D24 & D25 & D26 & D27 \\ D30 & D31 & D32 & D33 & D34 & D35 & D36 & D37 \\ D40 & D41 & D42 & D43 & D44 & D45 & D46 & D47 \\ D50 & D51 & D52 & D53 & D54 & D55 & D56 & D57 \\ D60 & D61 & D62 & D63 & D64 & D65 & D66 & D67 \\ D70 & D71 & D72 & D73 & D74 & D75 & D76 & D77 \end{bmatrix} \tag{2}$$

$$C = \begin{bmatrix} C00 & C01 & C02 & C03 & C04 & C05 & C06 & C07 \\ C10 & C11 & C12 & C13 & C14 & C15 & C16 & C17 \\ C20 & C21 & C22 & C23 & C24 & C25 & C26 & C27 \\ C30 & C31 & C32 & C33 & C34 & C35 & C36 & C37 \\ C40 & C41 & C42 & C43 & C44 & C45 & C46 & C47 \\ C50 & C51 & C52 & C53 & C54 & C55 & C56 & C57 \\ C60 & C61 & C62 & C63 & C64 & C65 & C66 & C67 \\ C70 & C71 & C72 & C73 & C74 & C75 & C76 & C77 \end{bmatrix} \tag{3}$$

-continued $$F = \begin{bmatrix} cf0 & cf0 & cf0 & cf0 & cf0 & cf0 & cf0 & cf0 \\ cf1 & cf3 & cf5 & cf7 & cf-7 & cf-5 & cf-3 & -cf1 \\ cf2 & cf6 & cf-6 & cf-2 & cf-2 & cf-6 & cf6 & cf2 \\ cf3 & cf-7 & cf-1 & cf-5 & cf5 & cf1 & cf7 & cf-3 \\ cf4 & cf-4 & cf-4 & cf4 & cf4 & cf-4 & cf-4 & cf4 \\ cf5 & cf-1 & cf7 & cf3 & cf-3 & cf-7 & cf1 & cf-5 \\ cf6 & cf-2 & cf2 & cf-6 & cf-6 & cf2 & cf-2 & cf6 \\ cf7 & cf-5 & cf3 & cf-1 & cf1 & cf-3 & cf5 & cf-7 \end{bmatrix} \quad (4)$$

cfx represent coefficients expressed by the following equation (5). The equation (5) represents coefficient of cosine conversion.

foregoing equation (3) by multiplying the weighting coefficient W and the cosine coefficients C shown in the equation (3):

$$\begin{bmatrix} W00C00 & W01C10 & W02C02 & W03C03 & W04C04 & W05V05 & W06C06 & W07C07 \\ W10C10 & W11C11 & W12C12 & W13C13 & W14C14 & W15C15 & W16C16 & W17C17 \\ W20C20 & W21C21 & W22C22 & W23C23 & W24C24 & W25C25 & W26C26 & W27C27 \\ W30C30 & W31C31 & W32C32 & W33C33 & W34C34 & W35C35 & W36C36 & W37C37 \\ W40C40 & W41C41 & W42C42 & W43C43 & W44C44 & W45C45 & W46C46 & W47C47 \\ W50C50 & W51C51 & W52C52 & W53C53 & W54C54 & W55C55 & W56C56 & W57C57 \\ W60C60 & W61C61 & W62C62 & W63C63 & W64C64 & W65C65 & W66C66 & W67C67 \\ W70C70 & W71C71 & W72C72 & W73C73 & W74C74 & W75C75 & W76C76 & W77C77 \end{bmatrix} \quad (8)$$

$$cf0 \equiv \frac{1}{\sqrt[2]{2}} \cos \frac{0}{16}\pi \quad (5)$$

$$cf1 \equiv \frac{1}{2} \cos \frac{1}{16}\pi$$

$$cf2 \equiv \frac{1}{2} \cos \frac{2}{16}\pi$$

$$cf3 \equiv \frac{1}{2} \cos \frac{3}{16}\pi$$

$$cf4 \equiv \frac{1}{2} \cos \frac{4}{16}\pi$$

$$cf5 \equiv \frac{1}{2} \cos \frac{5}{16}\pi$$

$$cf6 \equiv \frac{1}{2} \cos \frac{6}{16}\pi$$

$$cf7 \equiv \frac{1}{2} \cos \frac{7}{16}\pi$$

where cf-x=-cfx.

Expressing the inverse transform by the following equation (6), we have the following equation (7):

$$F^{-J} = F^T \quad (6)$$

$$D = F^T \cdot C \cdot F \quad (7)$$
$$= (F^T) \cdot C \cdot (F^T)^T$$

Specifically, study of the equation (6) reveals that the inverse transform matrix can be obtained by transposing the one-dimensional forward transform matrix F. Incidentally, cf-x=-cfx is established.

As shown by the following equation (8), the weighting circuit 3 weights the cosine coefficients C shown in the where the weighted result shown in the equation (8) is represented by a weighting value Wyx.

When the coefficient data is obtained by cosine-transforming the input data by the cosine transforming circuit 2 according to the equation (1), the coefficient data is supplied to the weighting circuit 3 and the weighting circuit 3 multiplies the coefficient data with the weighting coefficients shown in the equation (8), the circuit scale of the apparatus is increased and the number of the processing steps is increased.

SUMMARY OF THE INVENTION

In view of the aforesaid, it is an object of the present invention to provide a weighted cosine transform method in which a circuit scale of the apparatus can be reduced, the number of processing steps can be reduced and a cost can be reduced.

According to an aspect of the present invention, there is provided a weighted cosine transform method which comprises the step of carrying out a weighted cosine transform by using a new transform matrix which results from previously multiplying a weighting diagonal matrix and a cosine transform matrix when carrying out a weighted calculation in which a cosine-transformed coefficient is multiplied with diagonal matrixes from the right and left directions.

Further, according to the present invention, the cosine transform and the weighting are carried out by one calculation of the new transform matrix and input data.

According to the present invention, when a weighted calculation in which a cosine transformed coefficient is multiplied with a diagonal matrix from the right and left directions is carried out, the weighted cosine transform is carried out by using a new transform matrix which results from previously multiplying the weighting diagonal matrix and the cosine transform matrix.

BRIEF DESCRIPTION OF THE DRAWINGS

FIG. 1 is a schematic block diagram showing a cosine transform apparatus according to the related art;

FIG. 2 is a block diagram used to explain a cosine transform method according to an embodiment of the present invention;

FIG. 3 is a block diagram used to explain a cosine transform method according to the embodiment of the present invention;

DETAILED DESCRIPTION OF THE PREFERRED EMBODIMENT

Figure 4:
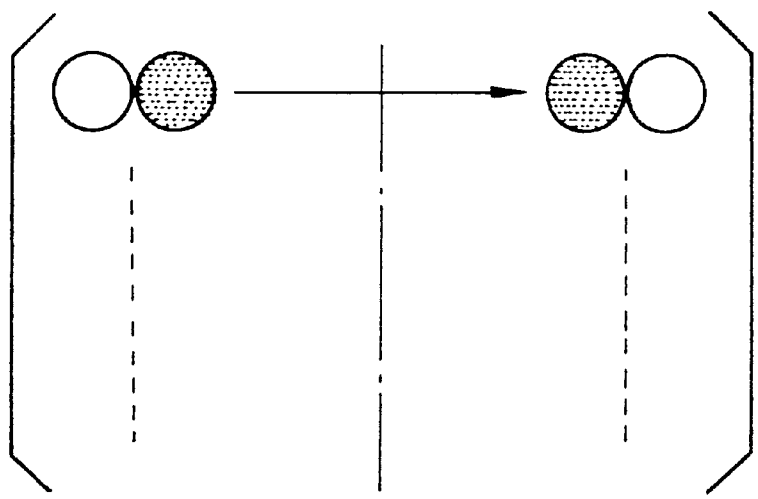
FIG. 4 is a diagram used to explain a transform matrix having an axial symmetry/anti-symmetry of the lateral direction.

A weighted cosine transform method according to an embodiment of the present invention will hereinafter be described with reference to FIGS. 2 and 3.

In FIG. 2, like parts corresponding to those of FIG. 1 are marked with the same references and therefore need not be described in detail.

As shown in FIG. 2, there is provided a cosine transforming/weighting circuit 7 which cosine-transforms a variety of data (image and audio data) supplied thereto through the input terminal 1 from the digital VTR or the transmission apparatus such as the teleconference system or the like, i.e., transforms image data to coefficient data ranging from a DC component to a high-order AC component. Also, the cosine transforming/weighting circuit 7 weights the coefficient data. Output data of the cosine transforming/weighting circuit 7 is supplied to a quantizer 4a, in which it is quantized at a predetermined quantization level. Quantized data from the quantizer 4a is supplied to a variable length coder (VLC) 4b which codes the quantized data supplied thereto in a proper variable length coding fashion using a variable length code, such as a run length code and a Huffman code. Data coded by the VLC 4b is supplied through the output terminal 5 to the recording system of the digital VTR or the body circuit of the transmission apparatus (not shown).

As shown in FIG. 3, various data (e.g., image and audio data) are supplied to an input terminal 8 from the reproducing system of the digital VTR or the transmission apparatus, such as the teleconference system (not shown). Data supplied to the input terminal 8 is decoded by a decoder 9b and inverse-quantized by an inverse quantizer 9a. Output data from the inverse quantizer 9a is supplied to an inverse cosine transforming/weighting releasing circuit 10.

The inverse cosine transforming/weighting releasing circuit 10 inverse-cosine-transforms the data supplied thereto from the inverse quantizer 9a and releases the weighting. Output data from the inverse cosine transforming/weighting releasing circuit 10 is supplied through an output terminal 11 to the reproducing system of the digital VTR or an output system of the transmission apparatus (not shown).

According to the embodiment of the present invention, the cosine transform and the weighting are carried out in one processing and also the inverse cosine transform and the releasing of the weighting are carried out in one processing.

Therefore, it is sufficient to provide the cosine transforming/weighting circuit 7 and the inverse cosine transforming/weighting releasing circuit 10. In order to effect the cosine transforming/weighting and the inverse cosine transforming/weighting releasing by the circuits 7 and 10, the embodiment of the present invention uses a new transform matrix which will be described below. A method of obtaining a new transform matrix will be described below.

The weight value Wyx shown in the equation (8) has an axial symmetry relative to a diagonal, i.e., Wyx=Wxy. Decomposing Wyx=Wxy, we have:

$$Wyx = Wy \cdot Wx \qquad (9)$$

A weighting calculation can be decomposed in the horizontal and vertical directions by effectively utilizing the axial symmetry of the transform matrix relative to the diagonal, and expressed by the calculation of the cosine coefficient C as in the following equation (10):

$$Cw = W \cdot C \cdot W \qquad (10)$$

where Cw represents the matrix of weighted cosine coefficient and W represents the diagonal matrix expressed by the following equation (11):

$$W = \frac{1}{2}\begin{bmatrix} W(0) & 0 & 0 & 0 & 0 & 0 & 0 & 0 \\ 0 & W(1) & 0 & 0 & 0 & 0 & 0 & 0 \\ 0 & 0 & W(2) & 0 & 0 & 0 & 0 & 0 \\ 0 & 0 & 0 & W(3) & 0 & 0 & 0 & 0 \\ 0 & 0 & 0 & 0 & W(4) & 0 & 0 & 0 \\ 0 & 0 & 0 & 0 & 0 & W(5) & 0 & 0 \\ 0 & 0 & 0 & 0 & 0 & 0 & W(6) & 0 \\ 0 & 0 & 0 & 0 & 0 & 0 & 0 & W(7) \end{bmatrix} \qquad (11)$$

From the equation (11), the weighting value shown in the equation (8) can be expressed by the following equation (12): In the equation (11), ½ may be removed.

$$Wyx = \frac{1}{4} W(y) \cdot W(x) \qquad (12)$$

The decomposed weighting matrix is taken into the transform matrix by the following equation (13):

$$Cw = W \cdot C \cdot W \qquad (13)$$
$$= W \cdot F \cdot D \cdot F^T \cdot W$$
$$= (W \cdot F) \cdot D \cdot (W \cdot F)^T$$

As is clear from the equation (13), it is sufficient that the transform matrix F is changed to a transform matrix Fw. Specifically, the transform matrix Fw can be expressed by the following equation (14):

$$Fw = W \cdot F = \frac{1}{2} \begin{bmatrix} W(0)cf0 & W(0)cf0 & W(0)cf0 & W(0)cf0 & W(0)cf0 & W(0)cf0 & W(0)cf0 & W(0)cf0 \\ W(1)cf1 & W(1)cf3 & W(1)cf5 & W(1)cf7 & W(1)cf-7 & W(1)cf-5 & W(1)cf-3 & W(1)cf-1 \\ W(2)cf2 & W(2)cf6 & W(2)cf-6 & W(2)cf-2 & W(2)cf-2 & W(2)cf-6 & W(2)cf6 & W(2)cf2 \\ W(3)cf3 & W(3)cf-7 & W(3)cf-1 & W(3)cf-5 & W(3)cf5 & W(3)cf1 & W(3)cf7 & W(3)cf-3 \\ W(4)cf4 & W(4)cf-4 & W(4)cf-4 & W(4)cf4 & W(4)cf4 & W(4)cf-4 & W(4)cf-4 & W(4)cf4 \\ W(5)cf5 & W(5)cf-1 & W(5)cf7 & W(5)cf3 & W(5)cf-3 & W(5)cf-7 & W(5)cf1 & W(5)cf-5 \\ W(6)cf6 & W(6)cf-2 & W(6)cf2 & W(6)cf-6 & W(6)cf-6 & W(6)cf2 & W(6)cf-2 & W(6)cf6 \\ W(7)cf7 & W(7)cf-5 & W(7)cf3 & W(7)cf-1 & W(7)cf1 & W(7)cf-3 & W(7)cf5 & W(7)cf-7 \end{bmatrix} \quad (14)$$

In inverse transform, assuming that $W^{-1}$ represents an inverse matrix of the diagonal matrix W, the input data D can be expressed by the following equation (15):

$$D = F^T \cdot W^{-1} \cdot Cw \cdot W^{-1} \cdot F \quad (15)$$
$$= (F^T \cdot W^{-1}) \cdot Cw \cdot (F^T \cdot W^{-1})^T$$

Study of the equation (15) reveals that the weighted inverse transform matrix F1/w can be expressed by the following equation (16):

$$2 \begin{bmatrix} cf0/W(0) & cf1/W(1) & cf2/W(2) & cf3/W(3) & cf4/W(4) & cf5/W(5) & cf6/W(6) & cf7/W(7) \\ cf0/W(0) & cf3/W(1) & cf6/W(2) & cf-7/W(3) & cf-4/W(4) & cf-1/W(5) & cf-2/W(6) & cf-5/W(7) \\ cf0/W(0) & cf5/W(1) & cf-6/W(2) & cf-1/W(3) & cf-4/W(4) & cf7/W(5) & cf2/W(6) & cf3/W(7) \\ cf0/W(0) & cf7/W(1) & cf-2/W(2) & cf-5/W(3) & cf4/W(4) & cf3/W(5) & cf-6/W(6) & cf-1/W(7) \\ cf0/W(0) & cf-7/W(1) & cf-2/W(2) & cf-5/W(3) & cf4/W(4) & cf3/W(5) & cf-6/W(6) & cf-1/W(7) \\ cf0/W(0) & cf-5/W(1) & cf-6/W(2) & cf1/W(3) & cf-4/W(4) & cf-7/W(5) & cf2/W(6) & cf-3/W(7) \\ cf0/W(0) & cf-3/W(1) & cf6/W(2) & cf7/W(3) & cf-4/W(4) & cf1/W(5) & cf-2/W(6) & cf5/W(7) \\ cf0/W(0) & cf-1/W(1) & cf2/W(2) & cf-3/W(3) & cf4/W(4) & cf-5/W(5) & cf6/W(6) & cf-7/W(7) \end{bmatrix} \quad (16)$$

The cosine transforming/weighting circuit 7 shown in FIG. 2 cosine-transforms and weights the input data by using the transform matrix shown in the equation (14). Therefore, the input data can be cosine-transformed and weighted by one processing.

When the IDCT is carried out in the digital VTR upon playback or in the transmission apparatus upon reception, the inverse cosine transforming/weighting releasing circuit 10 shown in FIG. 3 inverse-cosine-transforms and releases the weighting of reproduced or received data by using the inverse transform matrix shown in the equation (16).

A symmetry of the transform matrix will be described below with reference to FIGS. 4 and 5. The transform matrix F of the forward DCT has an axial symmetry/anti-symmetry of the lateral direction as shown in FIG. 4. As is clear from the equation (14), the transform matrix Fw including the weighting calculation also has a similar symmetry.

Figure 5:
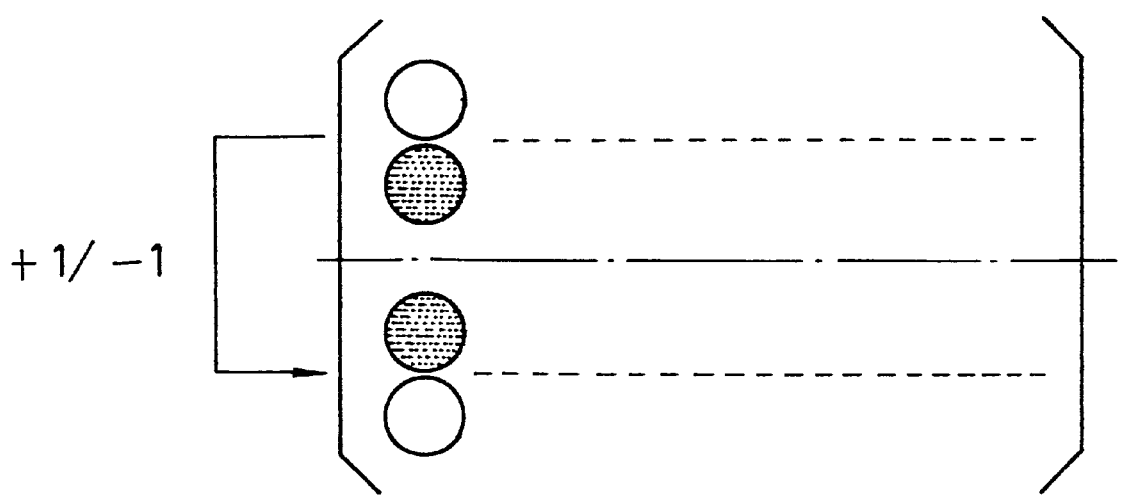
FIG. 5 is a diagram used to explain a transform matrix having an axial symmetry/anti-symmetry of the longitudinal direction.

As shown in FIG. 5, the inverse DCT matrix $F^T$ has an axial symmetry/anti-symmetry of the longitudinal direction. As is clear from the equation (16), the inverse transform matrix F1/w including the weighting calculation also has a similar feature.

Therefore, it is to be understood that the transform including the weighting calculation can be realized even by the calculation algorithm of the forward DCT and the inverse DCT using the symmetry of these transform matrixes.

From the equation (14), the forward DCT including the weighting calculation can be decomposed as in the following equations (17) and (18):

$$\begin{bmatrix} Y(0) \\ Y(1) \\ Y(2) \\ Y(3) \end{bmatrix} = \begin{bmatrix} W(0)cf0 & W(0)cf0 & W(0)cf0 & W(0)cf0 \\ W(2)cf2 & W(2)cf6 & W(2)cf-6 & W(2)cf-2 \\ W(4)cf4 & W(4)cf-4 & W(4)cf-4 & W(4)cf4 \\ W(6)cf6 & W(6)cf-2 & W(6)cf2 & W(6)cf-6 \end{bmatrix} \begin{bmatrix} X(0)+X(7) \\ X(1)+X(6) \\ X(2)+X(5) \\ X(3)+X(4) \end{bmatrix} \quad (17)$$

$$\begin{bmatrix} Y(1) \\ Y(2) \\ Y(3) \\ Y(4) \end{bmatrix} = \begin{bmatrix} W(1)cf1 & W(1)cf3 & W(1)cf5 & W(1)cf7 \\ W(3)cf3 & W(3)cf-7 & W(3)cf-1 & W(3)cf-5 \\ W(5)cf5 & W(5)cf-1 & W(5)cf7 & W(5)cf3 \\ W(7)cf7 & W(7)cf-5 & W(7)cf3 & W(7)cf-1 \end{bmatrix} \begin{bmatrix} X(0)+X(7) \\ X(1)+X(6) \\ X(2)+X(5) \\ X(3)+X(4) \end{bmatrix} \quad (18)$$

Therefore, the reproduced or received data can be inverse-cosine-transformed or released in weighting by one processing.

From the equation (16), the inverse DCT including the weighting calculation can be decomposed as in the following equations (19) and (20):

$$\begin{bmatrix} X(0) \\ X(1) \\ X(2) \\ X(3) \end{bmatrix} = \begin{bmatrix} cf0/W(0) & cf2/W(2) & cf4/W(4) & cf6/W(6) \\ cf0/W(0) & cf6/W(2) & cf-4/W(4) & cf-2/W(6) \\ cf0/W(0) & cf-6/W(2) & cf-4/W(4) & cf2/W(6) \\ cf0/W(0) & cf-2/W(2) & cf4/W(4) & cf-6/W(6) \end{bmatrix} \begin{bmatrix} Y(0) \\ Y(2) \\ Y(4) \\ Y(6) \end{bmatrix} + \quad (19)$$

$$\begin{bmatrix} cf1/W(1) & cf3/W(3) & cf5/W(5) & cf7/W(7) \\ cf3/W(1) & cf-7/W(3) & cf-1/W(5) & cf-5/W(7) \\ cf5/W(1) & cf-1/W(3) & cf7/W(5) & cf3/W(7) \\ cf7/W(1) & cf-5/W(3) & cf3/W(5) & cf-1/W(7) \end{bmatrix} \begin{bmatrix} Y(1) \\ Y(3) \\ Y(5) \\ Y(7) \end{bmatrix}$$

$$\begin{bmatrix} X(7) \\ X(6) \\ X(5) \\ X(4) \end{bmatrix} = \begin{bmatrix} cf0/W(0) & cf2/W(2) & cf4/W(4) & cf6/W(6) \\ cf0/W(0) & cf6/W(2) & cf-4/W(4) & cf-2/W(6) \\ cf0/W(0) & cf-6/W(2) & cf-4/W(4) & cf2/W(6) \\ cf0/W(0) & cf-2/W(2) & cf4/W(4) & cf-6/W(6) \end{bmatrix} \begin{bmatrix} Y(0) \\ Y(2) \\ Y(4) \\ Y(6) \end{bmatrix} + \quad (20)$$

$$\begin{bmatrix} cf1/W(1) & cf3/W(3) & cf5/W(5) & cf7/W(7) \\ cf3/W(1) & cf-7/W(3) & cf-1/W(5) & cf-5/W(7) \\ cf5/W(1) & cf-1/W(3) & cf7/W(5) & cf3/W(7) \\ cf7/W(1) & cf-5/W(3) & cf3/W(5) & cf-1/W(7) \end{bmatrix} \begin{bmatrix} Y(1) \\ Y(3) \\ Y(5) \\ Y(7) \end{bmatrix}$$

As is clear from the above description, when the cosine transform is realized as the hardware, the algorithm using the symmetry of the transform matrix is frequently used in order to reduce the circuit scale of the hardware. As described above, it is to be understood that, even when the cosine coefficients are weighted, the symmetry of the transform matrix can be used.

A weighting calculation for weighting the cosine transformed data without disturbing the symmetry of the transform matrix can be carried out as shown in the following equation (21). In this case, the weighting calculations in the horizontal direction and in the vertical direction can be set independently.

$$Cw = W \cdot C \cdot W' \quad (21)$$

where W and W' represent arbitrary diagonal matrixes.

As described above, according to this embodiment, when the weighting calculation in which the cosine-transformed coefficient C is multiplied with the diagonal matrix W shown in the equation (11) from the right and left directions, i.e., the calculation shown in the equation (10) is carried out, the new cosine transform matrix Fw shown in the equation (14) is obtained by multiplying the weighting diagonal matrix W and the cosine transform matrix F and the input data is transformed by using the new transform matrix. Therefore, the circuit scale can be reduced, the number of the processing steps can be minimized and the cost can be reduced.

Similarly, in the inverse transform, since the new inverse transform matrix F1/w shown in the equation (16) is obtained and the input data is transformed by using this new inverse transform matrix, the circuit scale can be reduced, the number of the processing steps can be minimized and the cost can be reduced.

According to the present invention, when the weighting coefficient calculation in which the cosine-transformed coefficient is multiplied with the diagonal matrix from the right and left directions is carried out, the weighting cosine transform is carried out by using the new transform matrix which results from previously multiplying the weighting diagonal matrix and the cosine matrix. Therefore, when the weighting cosine transform method is realized by the hardware, the circuit scale of the hardware can be reduced, whereby the processing steps can be simplified, the processing can be executed at high speed and the cost can be reduced. Further, when the weighted cosine transform method according to the present invention can be realized by the software, the number of the steps of the program can be reduced considerably. Thus, the processing steps can be simplified, the processing can be executed at high speed, and the cost can be reduced.

Furthermore, according to the present invention, since the cosine transform and the weighting can be executed by one calculation of the new transform matrix and the input data, in addition to the aforesaid effects, the number of the processing steps can be minimized when the cosine transform method according to the present invention is applied to any one of the hardware and the software. Also, the circuit scale can be minimized, whereby the processing speed can be increased and the cost can be reduced. In addition, the body apparatus can be miniaturized.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A method of compressing audio and/or video signals, comprising the steps of:

receiving said audio and/or video signals at an audio and/or video input port;

passing said audio and/or video signals from said audio and/or video input port to a transform/weighting means;

cosine transforming/weighting said audio and/or video signals with a weighted cosine transform matrix formed by multiplying a weighting diagonal matrix and a forward cosine transform matrix to produce transformed signals;

passing said transformed signals to a quantizing means distinct from said transform/weighting means to form quantized transformed signals; and passing said quantized transformed signals to an audio and/or video output port for transmission.

2. The method according to claim 1, wherein said weighted cosine transform matrix is a precalculated matrix of constant values formed from a combination of said weighting diagonal matrix and said forward cosine transform matrix.

3. The method according to claim 1, further comprising the steps of:

quantizing said transformed signals to produce quantized signals; and coding said quantized signals to produce coded signals.

4. A method of compressing audio and/or video signals, comprising the steps of:

receiving said audio and/or video signals at an audio and/or video input port;

passing said audio and/or video signals from said audio and/or video input port to a transform/weighting means;

weighted cosine transforming said audio and/or video signals with a weighted cosine transform matrix formed by multiplying a weighting diagonal matrix and a forward cosine transform matrix to produce processed signals;

weighted cosine transforming said processed signals with a transpose of said weighted cosine transform matrix to produce transformed signals;

passing said transformed signals to a quantizing means distinct form said transform/weighting means to form quantized transformed signals; and passing said quantized transformed signals to an audio and/or video output port for transmission.

5. The method according to claim 4, wherein said step of weighted cosine transforming said audio and/or video signals comprises weighted cosine transforming said audio and/or video signals from a left side by said weighted cosine transform matrix to produce said processed signals; and wherein said step of weighted cosine transforming said processed signals comprises weighted cosine transforming said audio and/or video signals from a right side by said transpose of the weighted cosine transform matrix to produce said transformed signals.

* * * * *